US012586016B2

(12) United States Patent
A S

(10) Patent No.: US 12,586,016 B2
(45) Date of Patent: Mar. 24, 2026

(54) INTEGRATION INSPECTOR FOR DATA TRANSFER BETWEEN CLOUD-BASED COMPUTING SYSTEMS AND DIGITAL CORE

(71) Applicant: SAP SE, Walldorf (DE)

(72) Inventor: Venkat Bhargav A S, Bengaluru (IN)

(73) Assignee: SAP SE, Walldorf (DE)

( * ) Notice: Subject to any disclaimer, the term of this patent is extended or adjusted under 35 U.S.C. 154(b) by 412 days.

(21) Appl. No.: 18/321,075

(22) Filed: May 22, 2023

(65) Prior Publication Data

US 2024/0394620 A1      Nov. 28, 2024

(51) Int. Cl.
*G06Q 10/0631*      (2023.01)
*G06F 16/27*      (2019.01)

(52) U.S. Cl.
CPC ..... *G06Q 10/06313* (2013.01); *G06F 16/273* (2019.01)

(58) Field of Classification Search
CPC ........................ G06Q 10/06313; G06F 16/273
See application file for complete search history.

(56) References Cited

U.S. PATENT DOCUMENTS

| | | | | |
|---|---|---|---|---|
| 9,092,395 | B2 * | 7/2015 | Bradfield | .............. G06F 11/261 |
| 2014/0297846 | A1 * | 10/2014 | Hoja | ..................... H04L 43/106 |
| | | | | 709/224 |
| 2018/0077007 | A1 * | 3/2018 | Olson | ................. G06F 11/2033 |
| 2024/0386027 | A1 * | 11/2024 | Ressler | ................ G06F 16/254 |

* cited by examiner

*Primary Examiner* — Jay A Morrison
(74) *Attorney, Agent, or Firm* — Buckley, Maschoff & Talwalkar LLC

(57)      ABSTRACT

According to some embodiments, a digital core for a cloud computing environment is associated with an enterprise (e.g., the digital core may comprise enterprise resource planning software optimized for an in-memory database). Moreover, an integration inspector framework may establish a checkpoint between an application system (e.g., a source application system to provide information via the digital core and/or a target application system to receive information via the digital core) and the digital core. The integration inspector framework then automatically validates a communication arrangement associated with the application system and performs a data replication test, in connection with the application system and the digital core, using test data. A result of the data replication test is then evaluated and indicated (e.g., to a user via a user interface).

13 Claims, 18 Drawing Sheets

1200

| SOURCE SYSTEM IDENTIFIER 1302 | TARGET SYSTEM IDENTIFIER 1304 | KEY FIELD IDENTIFIERS 1306 | RESULT 1308 |
|---|---|---|---|
| SS_101 | TS_101 | F.1, F.2 | SUCCESS |
| SS_101 | TS_102 | F.1, F.2 | ERROR |
| SS_102 | TS_101 | F.1, F.5, F.6, F.7 | SUCCESS |
| SS_104 | TS_103 | F.2, F.8 | ERROR |

| SOURCE SYSTEM | TARGET SYSTEM | STATUS | TEST DATA | INFERENCE |
|---|---|---|---|---|
| A | Digital Core | SUCCESS | ✓ | Integration and Data Replication Successful |
| B | Digital Core | SUCCESS | ✓ | Integration and Data Replication Successful |
| A | B | SUCCESS | ✗ | Communication Arrangement Should Be Checked Again or Re-Routed to Concerned xx-xx Component |

INTEGRATION INSPECTOR FOR DATA TRANSFER BETWEEN CLOUD-BASED COMPUTING SYSTEMS AND DIGITAL CORE

BACKGROUND

An organization may use multiple application systems to process information. For example, an organization may use application systems to handle human resources information, analyze financial data, process purchase orders, etc. Moreover, organizations are increasingly using such application systems in a cloud computing environment (e.g., operated by an enterprise acting as a cloud computing provider). For example, FIG. 1 is an example of a cloud computing environment 100 having a digital core 150. The digital core 150 may be, for example, associated with enterprise resource planning software optimized for an in-memory database (e.g., the SAP™ S/4HANA® cloud). Various systems may exchange information via the digital core 150, including those associated with the Internet of Things ("IoT") 182, business networks 184, social networks 186, particular people 188, particular devices 190, and big data sources 192. Such system might be associated with the enterprise operating the digital core 150 such as the SAP™ Global Trade Service® ("GTS") that manages the complexities of international trade including regulatory compliance, electronic communication with customs authorities, risk mitigation, and importing/exporting on a global basis. Other examples of application systems include those associated with human capital management 110 using a Software-as-a-Services ("SaaS") model (e.g., SAP™ SuccessFactors®), vendor management 120 for procurement and external workforce management programs 120 (e.g., SAP™ Field-Glass®), travel and expense management 130 (e.g., SAP™ Concur®), product content management 140 (e.g., SAP™ Hybris®), spend management 160 (e.g., SAP™ Ariba®), etc.

Integrating the various components of the cloud computing environment 100 is a manual process. For example, the communication arrangements between the application systems and the digital core 150 may need to be manually configured and tested so that one system can successfully send data to another system. This can require that multiple teams work together to ensure that the information is correctly transferred, which can be a time-consuming and error prone process.

Systems are desired that facilitate the integration of application systems with a digital core for such a cloud computing environment 100.

SUMMARY

According to some embodiments, methods and systems may include a digital core for a cloud computing environment that is associated with an enterprise (e.g., the digital core may comprise enterprise resource planning software optimized for an in-memory database). Moreover, an integration inspector framework may establish a checkpoint between an application system (e.g., a source application system to provide information via the digital core and/or a target application system to receive information via the digital core) and the digital core. The integration inspector framework then automatically validates a communication arrangement associated with the application system and performs a data replication test, in connection with the application system and the digital core, using test data. A result of the data replication test is then evaluated and indicated (e.g., to a user via a user interface).

Some embodiments comprise: means for determining a digital core for a cloud computing environment associated with an enterprise; means for determining an application system to be integrated with the digital core; means for establishing, by a computer processor of an integration inspector framework, a checkpoint between the application system and the digital core; means for automatically validating a communication arrangement associated with the application system; means for performing a data replication test, in connection with the application system and the digital core, using test data; means for evaluating a result of the data replication test; and means for indicating an integration inspection result of said evaluation.

Some technical advantages of some embodiments disclosed herein are improved systems and methods associated with integrating an application system with a digital core in an efficient and accurate manner.

BRIEF DESCRIPTION OF THE DRAWINGS

FIG. 13 is a portion of a tabular integration data store according to some embodiments.

DETAILED DESCRIPTION

Briefly, some embodiments facilitate the integration of application systems with a digital core for a cloud computing environment. In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
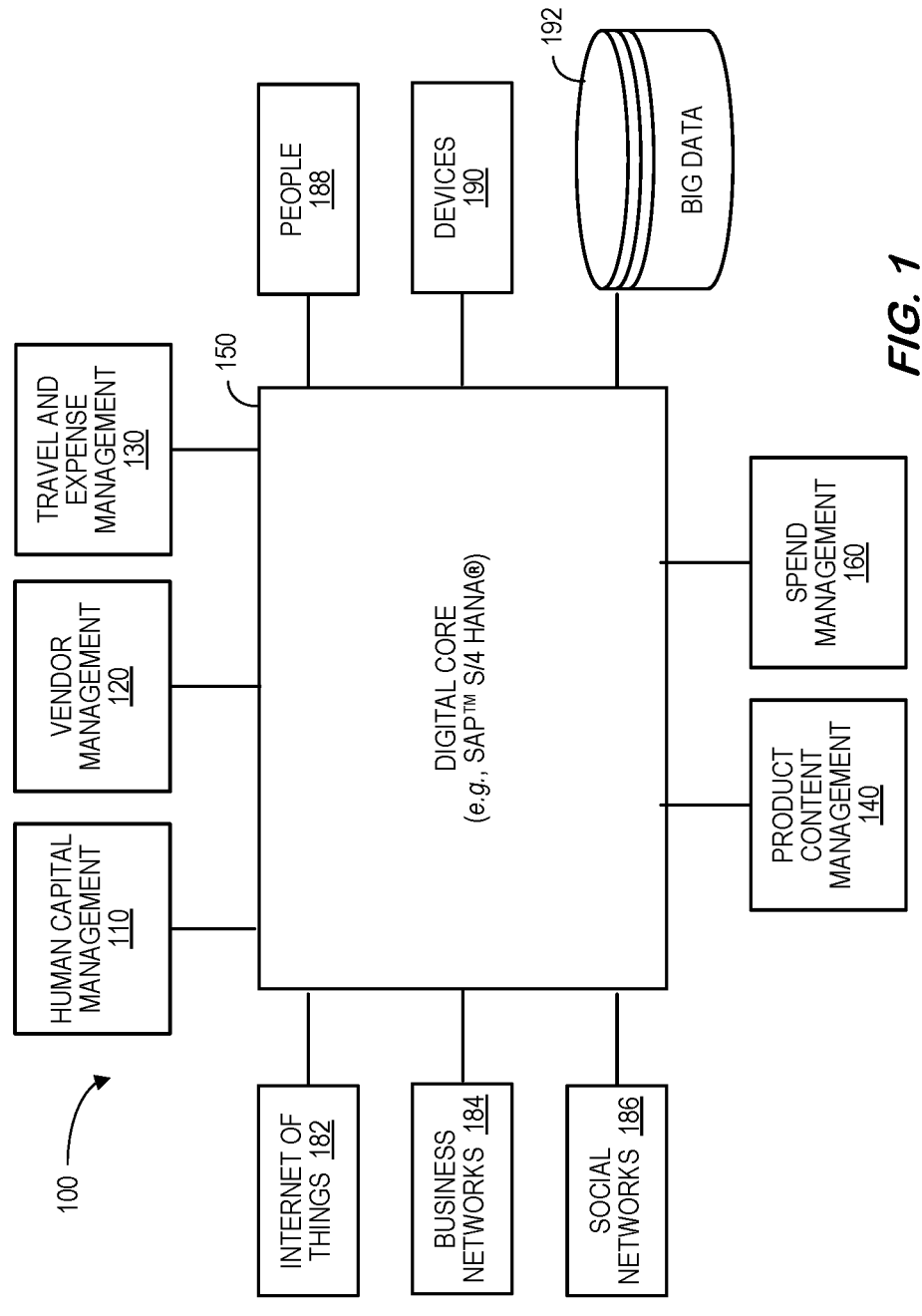
FIG. 1 is an example of a cloud computing environment.
Figure 2:
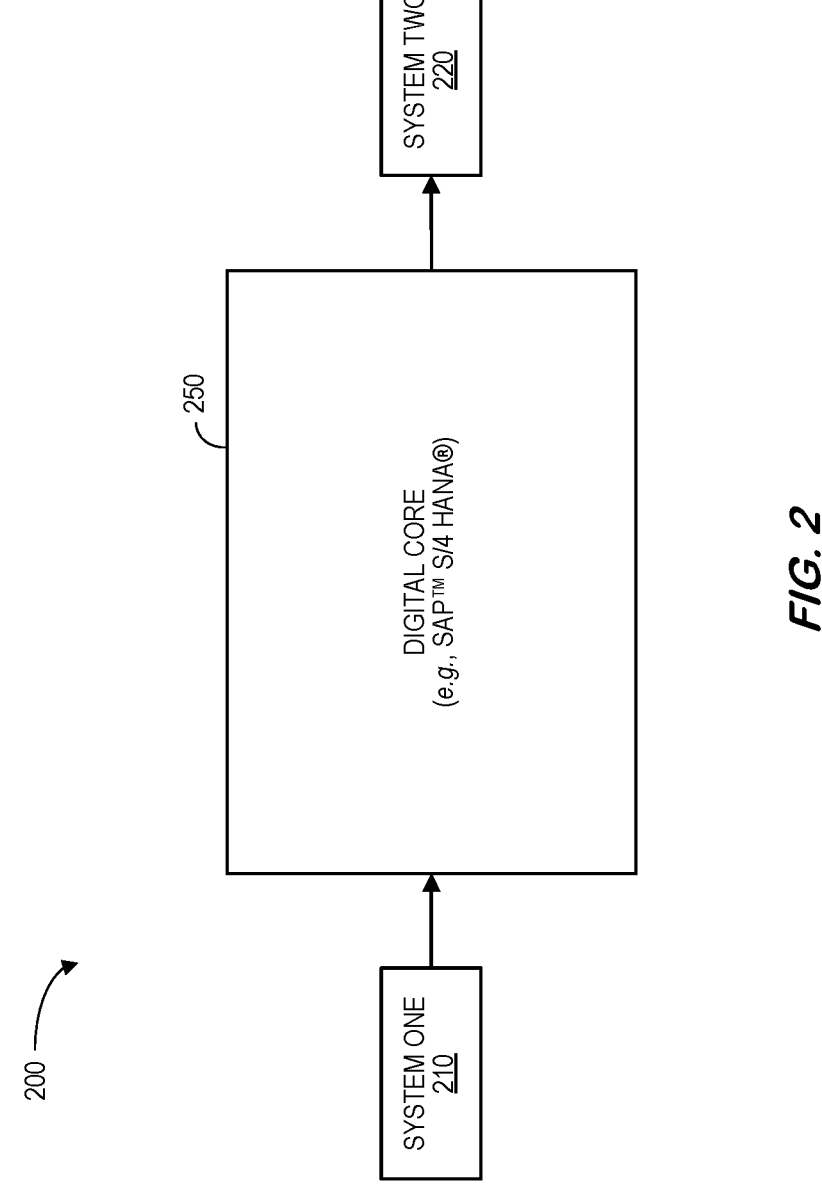
FIG. 2 is an example of digital core integration.
Figure 3:
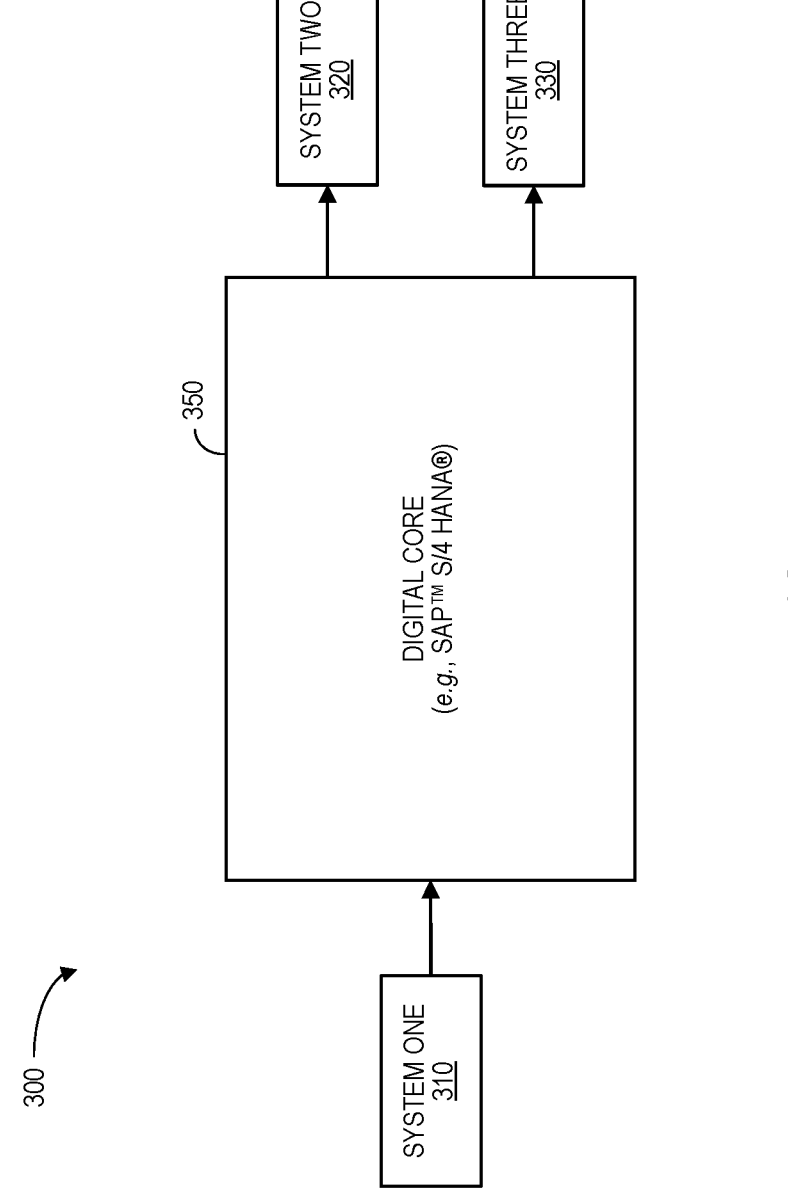
FIG. 3 is an example of parallel integration.

Consider, for example, FIG. 2 which illustrates digital core integration 200. In this case, the integration includes system one 210 and system two 220 coupled to a digital core 250. In this example, system one 210 might send data to system two 220 via the digital core 250, the digital core 250 might send data to system one 210 and system two 220, etc. As another example, FIG. 3 illustrates parallel integration 300 in which system one 310, system two 320, and system three 330 are coupled to a digital core 350. As used herein, the term "parallelized" data transfer may refer to an exchange of information to multiple system at the same time. In this example, system one 310 might send data to both system two 220 and system three 330 in parallel via the digital core 350, the digital core 350 might send data to system one 310, system two 320, and system three 330, etc. In this way, the system may support parallelized data transfer capabilities while safeguarding a digital core 350 strategy.

Figure 4:
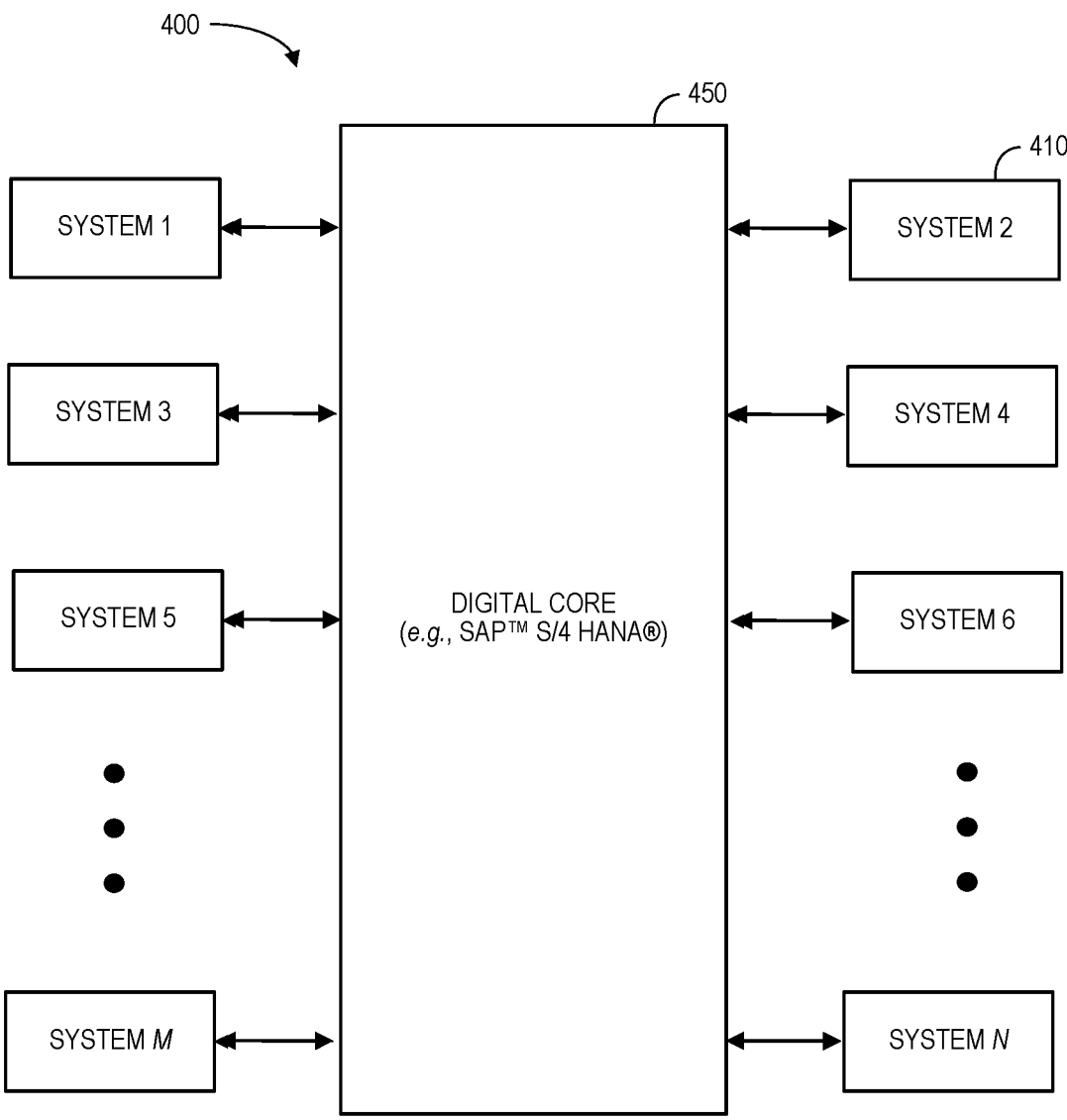
FIG. 4 is an example of a generic integration block diagram.
Figure 5:
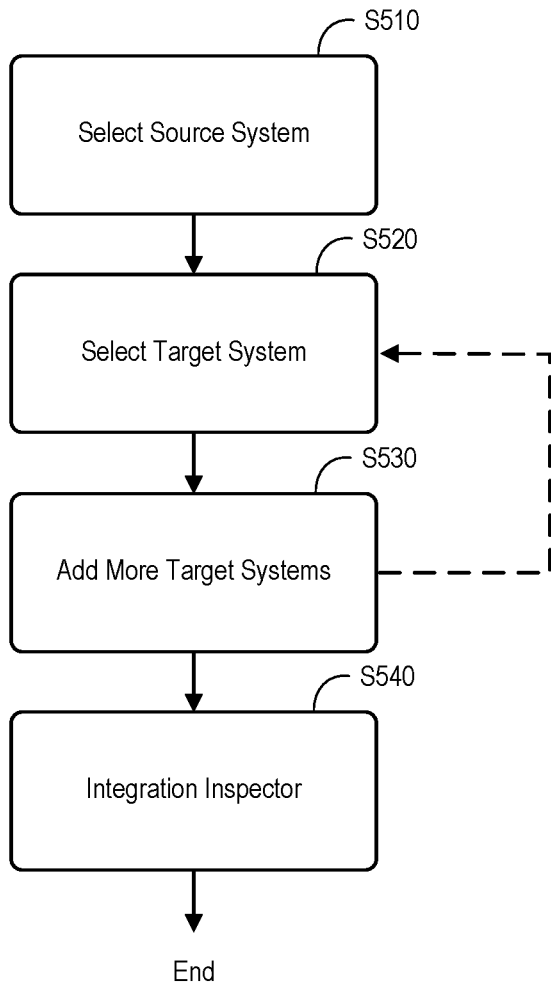
FIG. 5 is an integration method according to some embodiments.

FIG. 4 is a generic integration block diagram 400. Here, systems 410 (1 through N) can exchange information via a digital core 450. According to some embodiments, a user or process may select a source system (to send data) and one or more target systems (to receive data). For example, FIG. 5 is an integration method according to some embodiments. In particular, a source system is selected at S510 and a target system is selected at S520. For example, a vendor management system might be selected at S510 and a digital core (or spend management system) might be selected at S520. If one or more additional target systems are desired at S530, the process may continue at S520. When this setup is complete, the system may execute an integration inspector at S540 to ensure seamless integration between the source and target systems (e.g., to protect a digital core strategy without manual intervention). According to some embodiments, the integration inspector performs a thorough integration check for proper data replication at S540 using demo/test data to ensure an appropriate communication configuration. Note that the integration inspector may additionally be used individually by internal enterprise teams and by outside organizations (e.g., cloud customers) as a standalone or integrated tool, application, or logic that plugs into an existing integration process to check the readiness of the integration and validate data replication with mock test data.

Figure 6:
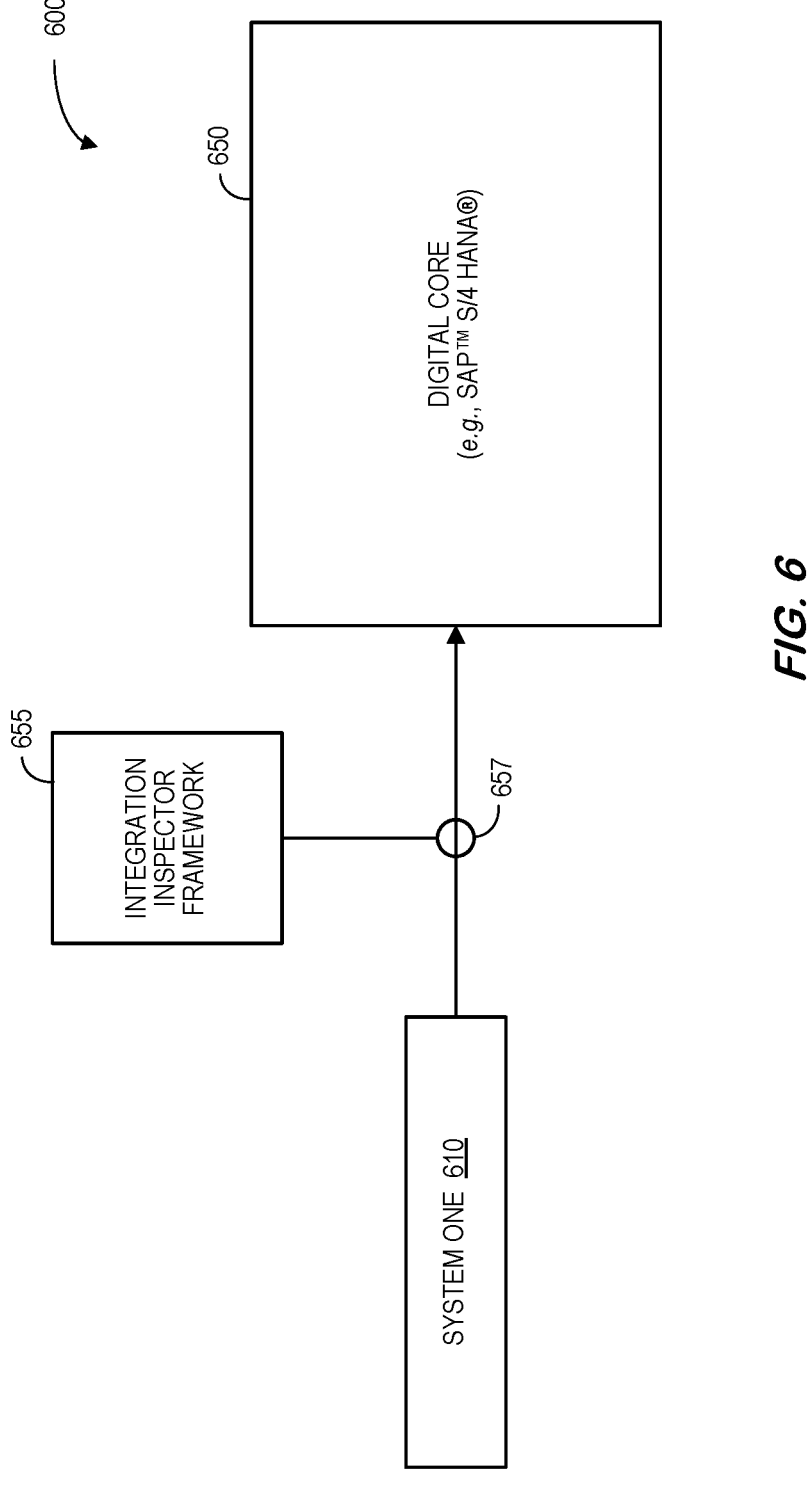
FIG. 6 is high-level block diagram of a system in accordance with some embodiments.

FIG. 6 is high-level block diagram of a system 600 in accordance with some embodiments. The system 600 includes application system one 610 coupled to a digital core 650. Moreover, an integration inspector framework 655 establishes a checkpoint 657 between system one 610 and the digital core 650. According to some embodiments, devices, including those associated with the system 600 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 600 may store data into and/or retrieve data from various data stores (e.g., a mock replication data store and/or a field mapping data store), which may be locally stored or reside remote from the integration inspector framework 655 and/or digital core 650. Although a single integration inspector framework 655 is shown in FIG. 6, any number of such devices may be included. Moreover, various devices described herein might be combined according to embodiments of the present invention. For example, in some embodiments, the integration inspector framework 655 and digital core 650 might comprise a single component or apparatus. Some or all of the system 600 functions may be performed by a constellation of networked apparatuses, such as in a distributed processing or cloud-based architecture.

An operator (e.g., a database administrator) may access the system 600 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 600.

Figure 7:
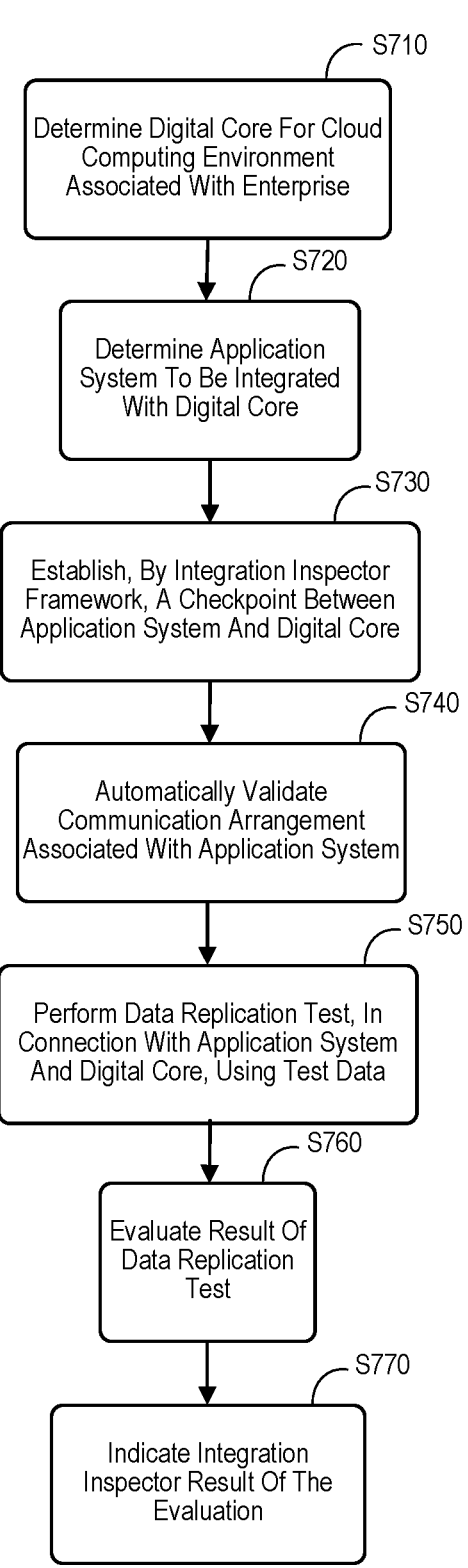
FIG. 7 is a more detailed integration method according to some embodiments.

FIG. 7 is a more detailed integration method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S710, a digital core may be determined for a cloud computing environment associated with an enterprise. The digital core might be, for example, associated with enterprise resource planning software optimized for an in-memory database. According to some embodiments, the digital core may be determined via a user interface. At S720, an application system may be determined to be integrated with the digital core. For example, the application system might be associated a source application system that provides information via the digital core and/or a target application system that receives information via the digital core. By way of examples only, the application system might be associated with an IoT system, a business network, a social network, particular person (or group of people), a particular device (or group of devices), big data, a GTS, a human capital management system, a vendor management system, a travel and expense management system, a product content management system, a spend management system, etc.

At S730, a computer processor of an integration inspector framework may establish a checkpoint between the application system and the digital core. The system may then automatically validate a communication arrangement associated with the application system at S740. Moreover, according to some embodiments, the system may perform a data replication test at S750, in connection with the application system and the digital core, using test data. In some embodiments, the integration inspection framework automatically maps key fields between the source application system, the digital core, and the target application system to ensure seamless integration. At S760, the system may evaluate a result of the data replication test and indicate an integration inspection result of said evaluation at S770 (e.g., via a user interface).

In this way, embodiments may provide an integration inspector to check the integration status at each and every integration point (using granular checkpoints) to protect the development time of the many teams involved with internal and customer system setups. Moreover, logic may be provided that lets the system automatically check integration setup with a mock data replication before actual data is replicated. Such a setup may reduce data transfer interruptions between various systems across a digital core while helping to maintain data centrally (at the digital core) and protecting a digital core strategy.

Figure 8:
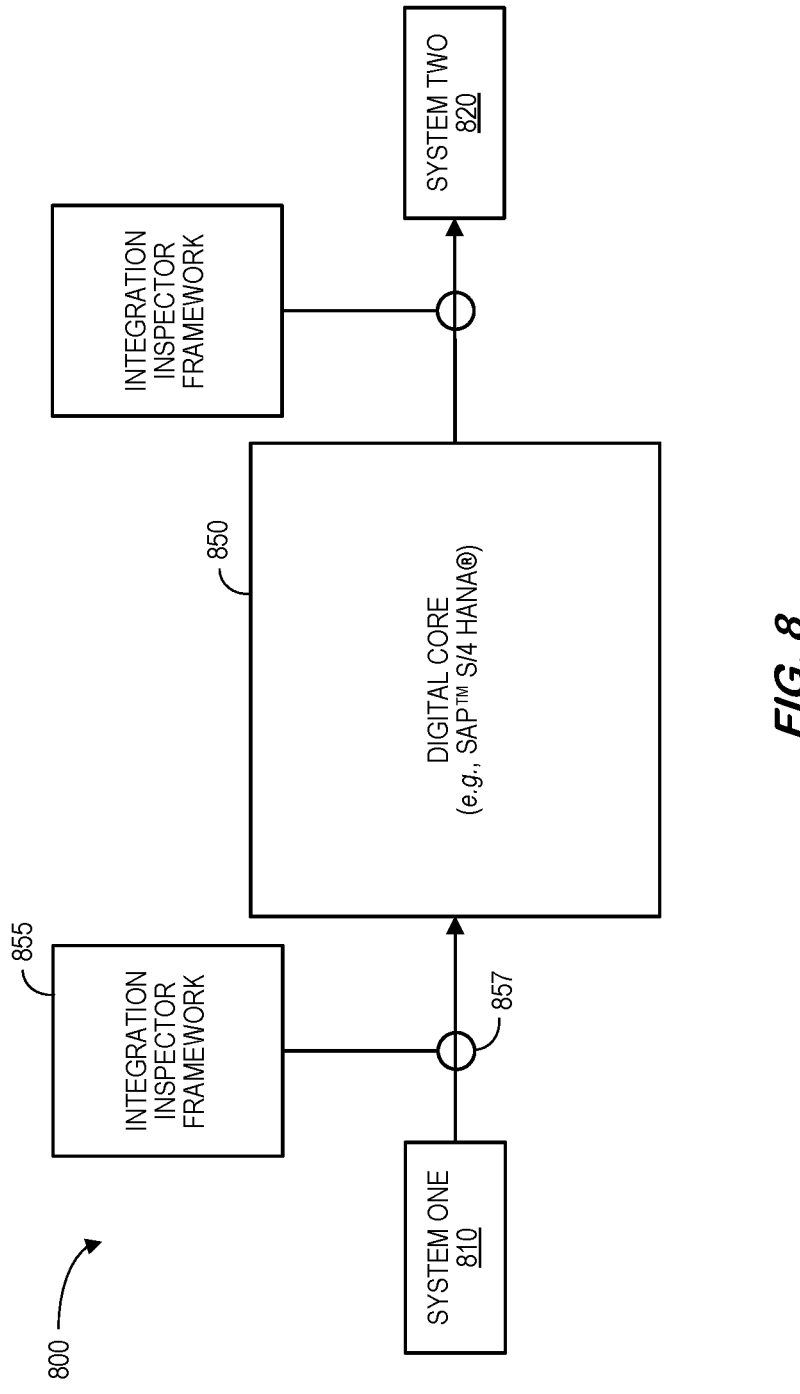
FIG. 8 is an example of integration inspector checkpoints in accordance with some embodiments.
Figure 9:
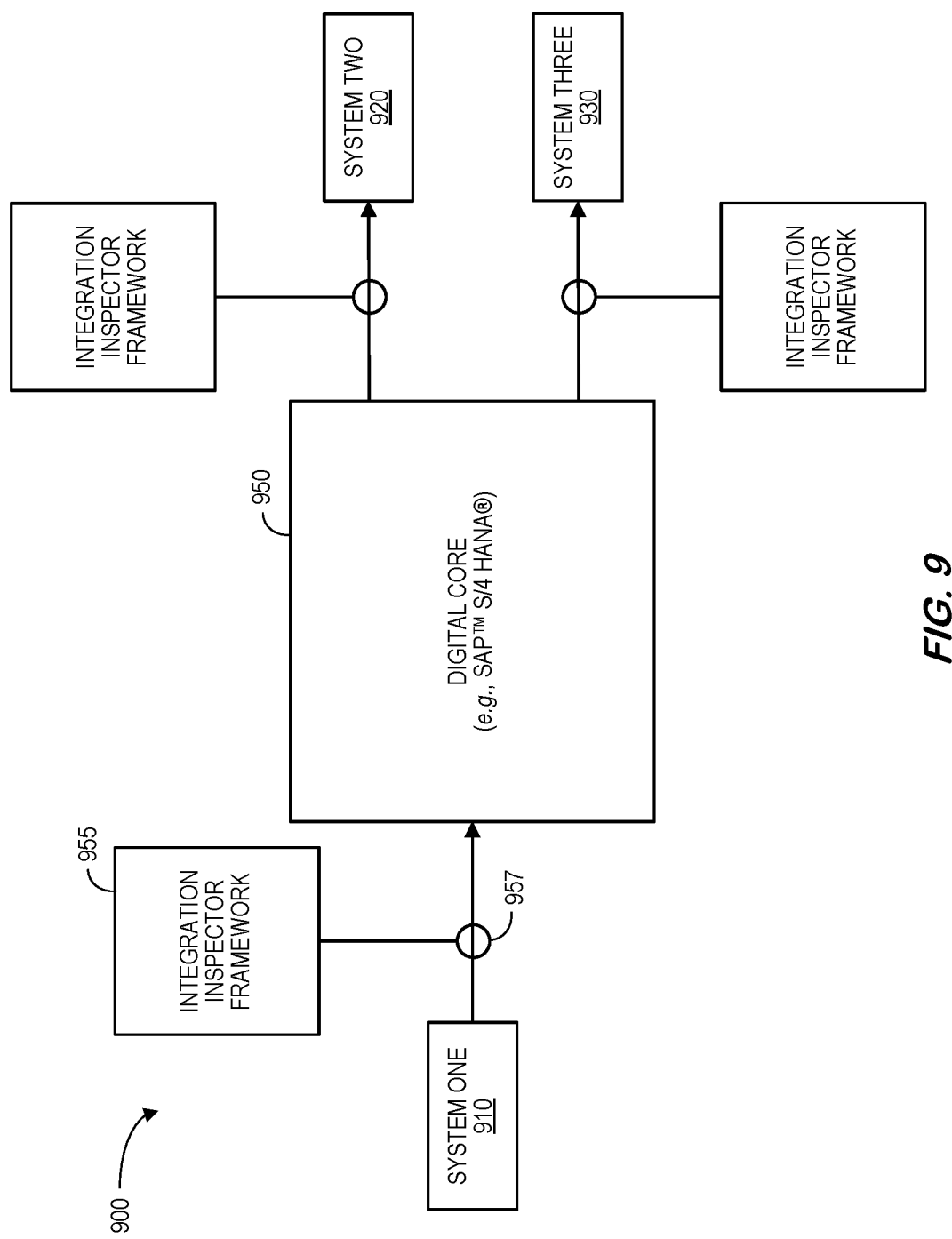
FIG. 9 is an example of checkpoints for parallel integration according to some embodiments.

FIG. 8 is an example 800 of integration inspector checkpoints in accordance with some embodiments. In this case, the integration includes system one 810 and system two 820 coupled to a digital core 850. In this example 800, system one 810 might send data to system two 820 via the digital core 850, the digital core 850 might send data to system one 810 and system two 820, etc. An integration inspector framework 855 establishes checkpoints 857: (1) between system one 810 and the digital core 850, and (2) between the digital core 850 and system two 820. As another example, FIG. 9 illustrates parallel integration 900 in which system one 910, system two 920, and system three 930 are coupled to a digital core 950. In this example, system one 910 might send data to both system two 920 and system three 930 in parallel via the digital core 950, the digital core 950 might send data to system one 910, system two 920, and system three 930, etc. In this way, the system may support parallelized data transfer capabilities while safeguarding a digital core 950 strategy. An integration inspector framework 955 establishes checkpoints 957: (1) between system one 910 and the digital core 950, (2) between the digital core 950 and system two 920, and (3) between the digital core 950 and system three 930. The checkpoints 957 may verify any integration rules required to configure communications and enable a secure/seamless integration customer experience while minimizing manual efforts across teams.

Figure 10:
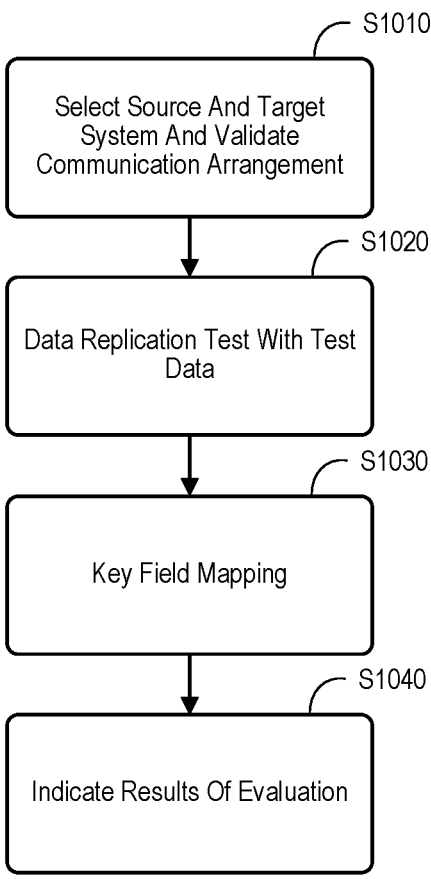
FIG. 10 is an integration field mapping method in accordance with some embodiments.

FIG. 10 is an integration field mapping method in accordance with some embodiments. At S1010, the source and target systems may be selected and the communication arrangement required for integration may be validated. For example, a vendor management system may be selected as a source system and a digital core may be selected as a target system. In this case, the system may verify that a vendor identifier field is available in both systems in the same format. A data replication test may then be performed with test data at S1020. For example, a mock file may be used to initiate a transfer of data from the vendor management system to the digital core.

Figure 11:
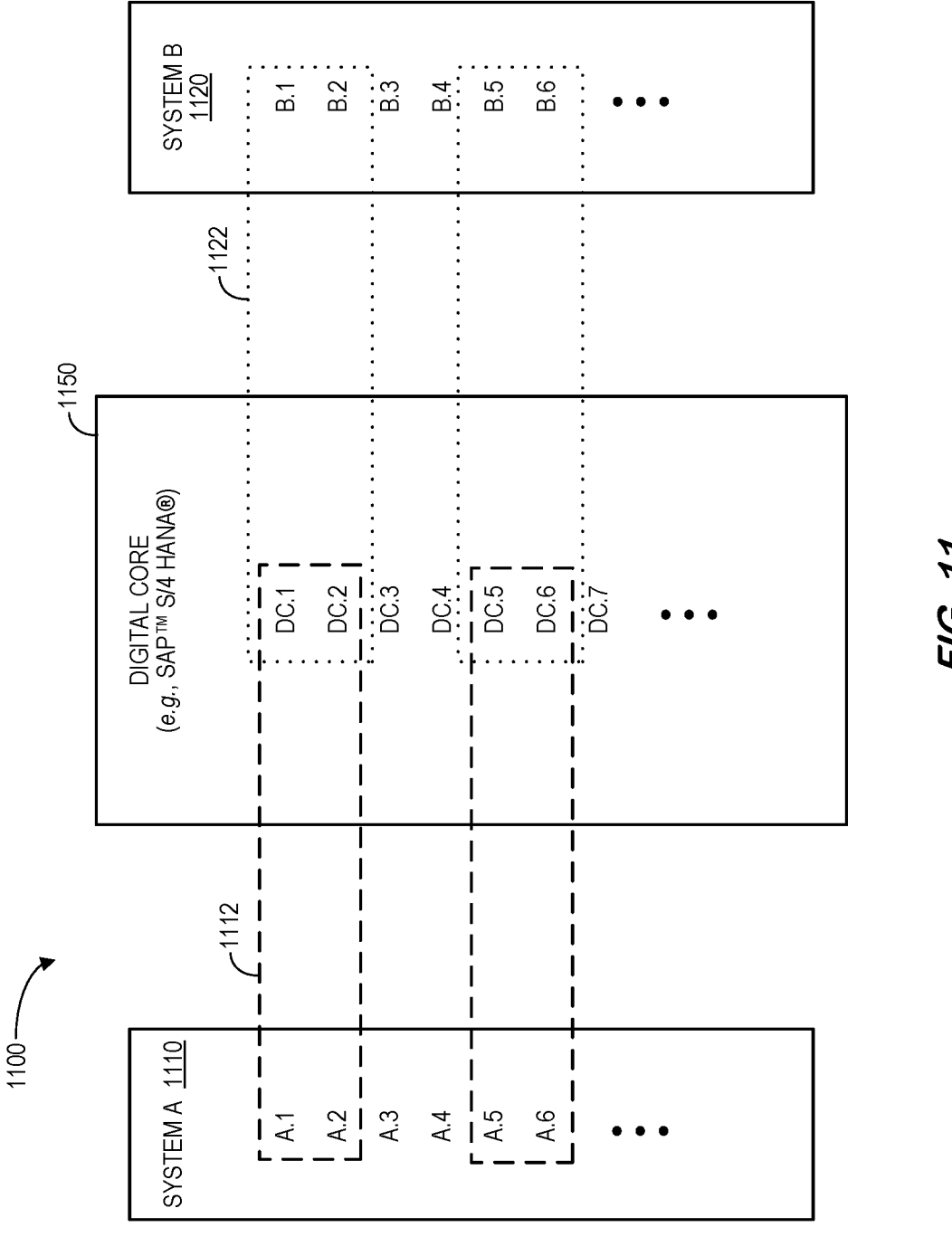
FIG. 11 is a field mapping example according to some embodiments.

According to some embodiments, key field mapping may be performed at S1030 as part of the integration process. For example, FIG. 11 is a field mapping example 1100 according to some embodiments. Here, the integration involves the communication of information from system A 1110 to system B 1120 via a digital core 1150. System A 1110 may have fields A.1, A.2, A3, . . . ; system B 1120 may have fields B.1, B.2, B.3, . . . ; and the digital core may have fields DC.1, DC.2, DC.3, . . . . The system may identify some of the information fields as being a "key field" and verify the appropriate mapping 1112 of those fields between integration components 1110, 1150 and a mapping 1122 between integration components 1150, 1120. For example, field A.1 may map to field DC.1 which in turn maps to field B.1. Referring again to FIG. 10, safter the mappings 1112 are verified the system may indicate the results of the integration evaluation at S1040. For example, the integration inspector might show a "success" (green) status or an "error" (red) status. In response to an error status, an end user may further investigate the communication arrangement.

Figure 12:
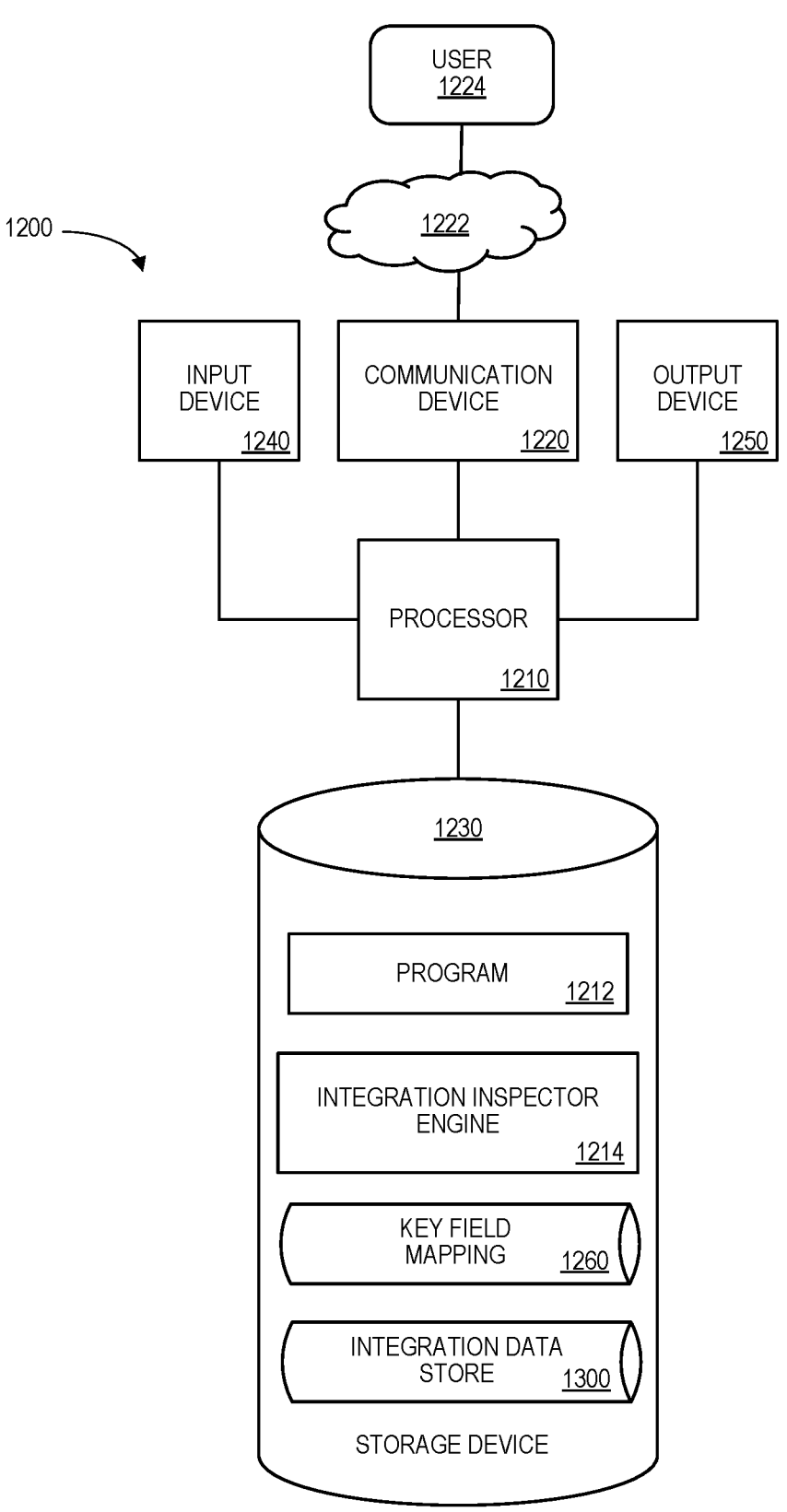
FIG. 12 is an apparatus in accordance with some embodiments.

Note that the embodiments described herein may be implemented using any number of different hardware configurations. For example, FIG. 12 is a block diagram of an apparatus or platform 1200 that may be, for example, associated with the systems 600, 800, 900 of FIGS. 6, 8, and 9, respectively (and/or any other system described herein). The platform 1200 comprises a processor 1210, such as one or more commercially available CPUs in the form of one-chip microprocessors, coupled to a communication device 1220 configured to communicate via a communication network (not shown in FIG. 12). The communication device 1220 may be used to communicate, for example, with one or more remote user platforms or devices 1224 via a communication network 1222. The platform 1200 further includes an input device 1240 (e.g., a computer mouse and/or keyboard to input data about field mappings) and an output device 1250 (e.g., a computer monitor to render a display, transmit recommendations or alerts, and/or create monitoring reports). According to some embodiments, a mobile device and/or PC may be used to exchange data with the platform 1200.

The processor 1210 also communicates with a storage device 1230. The storage device 1230 can be implemented as a single database, or the different components of the storage device 1230 can be distributed using multiple databases (that is, different deployment data storage options are possible). The storage device 1230 may comprise any appropriate data storage device, including combinations of magnetic storage devices (e.g., a hard disk drive), optical storage devices, mobile telephones, and/or semiconductor memory devices. The storage device 1230 stores a program 1212 and/or integration inspector engine 1214 for controlling the processor 1210. The processor 1210 performs instructions of the programs 1212, 1214, and thereby operates in accordance with any of the embodiments described herein. For example, the processor 1210 may establish a checkpoint between an application system and a digital core. The processor 1210 may then automatically validate a communication arrangement associated with the application system and perform a data replication test, in connection with the application system and the digital core, using test data. A result of the data replication test is then evaluated and indicated by the processor 1210 (e.g., to a user via a user interface).

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, data may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores key field mappings 1260 and an integration data store 1300. An example of a database that may be used in connection with the platform 1200 will now be described in detail with respect to FIG. 13. Note that the database described herein is only one example, and additional and/or different data may be stored therein. Moreover, various databases might be split or combined in accordance with any of the embodiments described herein.

Referring to FIG. 13, a table is shown that represents the integration data store 1300 that may be stored at the platform 1200 according to some embodiments. The table may include, for example, entries identifying integrations being evaluated in connection with a cloud computing environment. The table may also define fields 1302, 1304, 1306, 1308 for each of the entries. The fields 1302, 1304, 1306, 1308 may, according to some embodiments, specify: a source system identifier 1302, a target system identifier 1304, key field identifiers 1306, and a result 1308. The integration data store 1300 may be created and updated, for example, when a new application system is added, a new integration inspector communication rule is established, etc.

The source and target system identifiers 1302, 1304 might be unique alphanumeric labels or links that are associated with application systems and/or a digital core that are being integrated. The key field identifiers 1306 may indicate certain data items that need to be correctly mapped between those systems (e.g., an expense date may need to be available in both a source application and target application in the same format). The result 1308 might indicate if, for example, the integration inspector has determined the communication arrangement is a "success" or has an "error."

Figure 14:
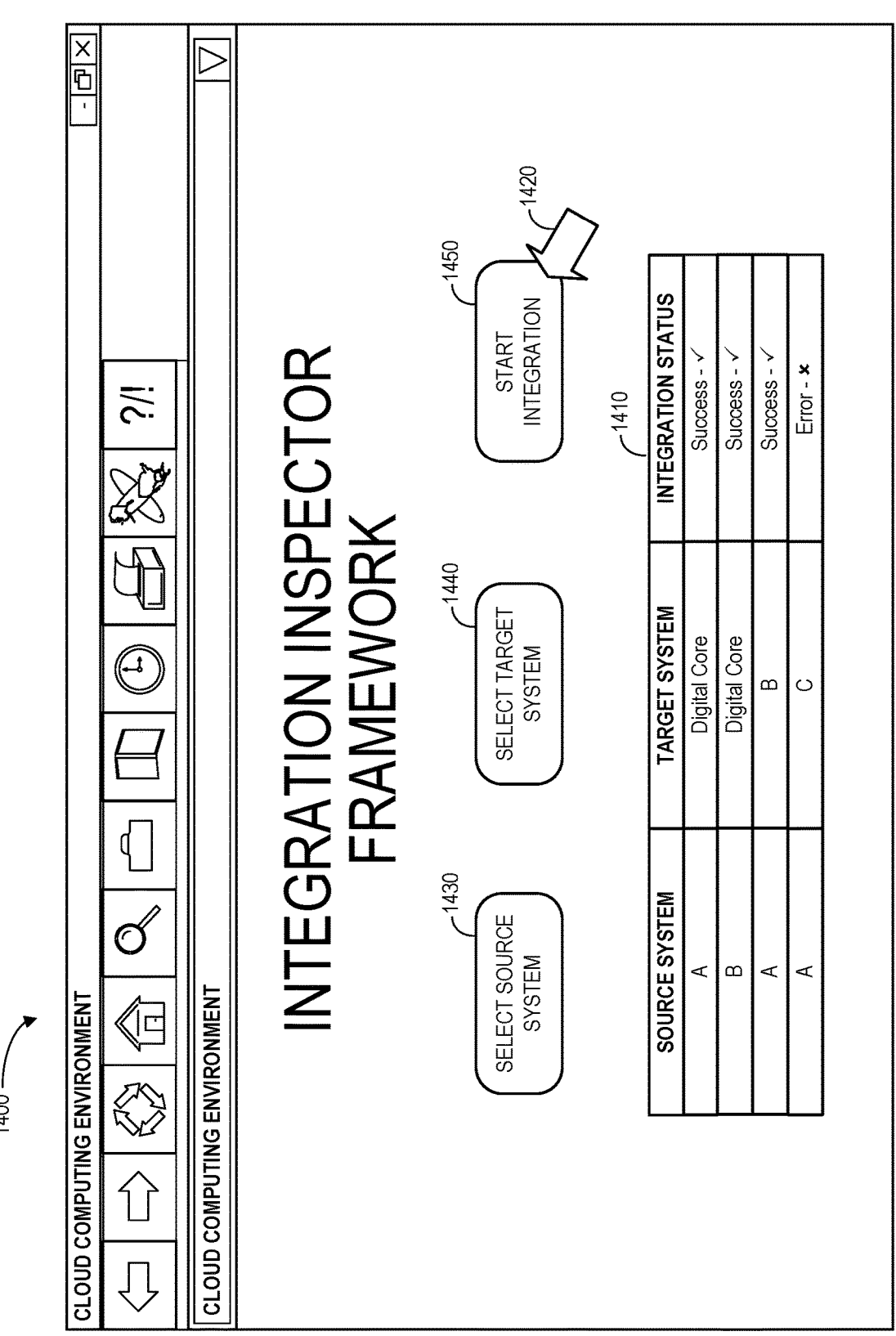
FIG. 14 is an example of an integration inspector user interface in accordance with some embodiments.
Figure 15:
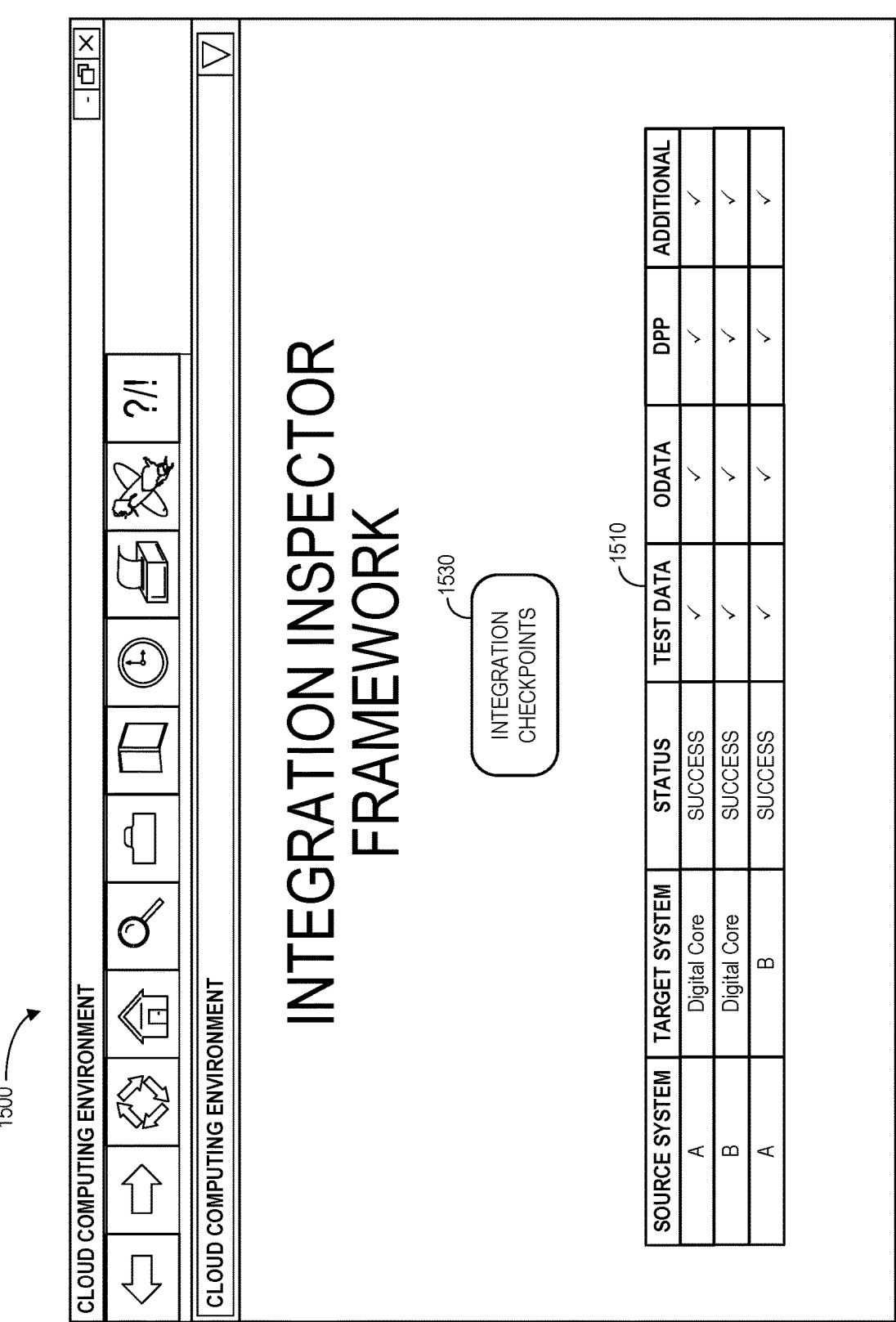
FIG. 15 is another example of an integration inspector user interface according to some embodiments.
Figure 16:
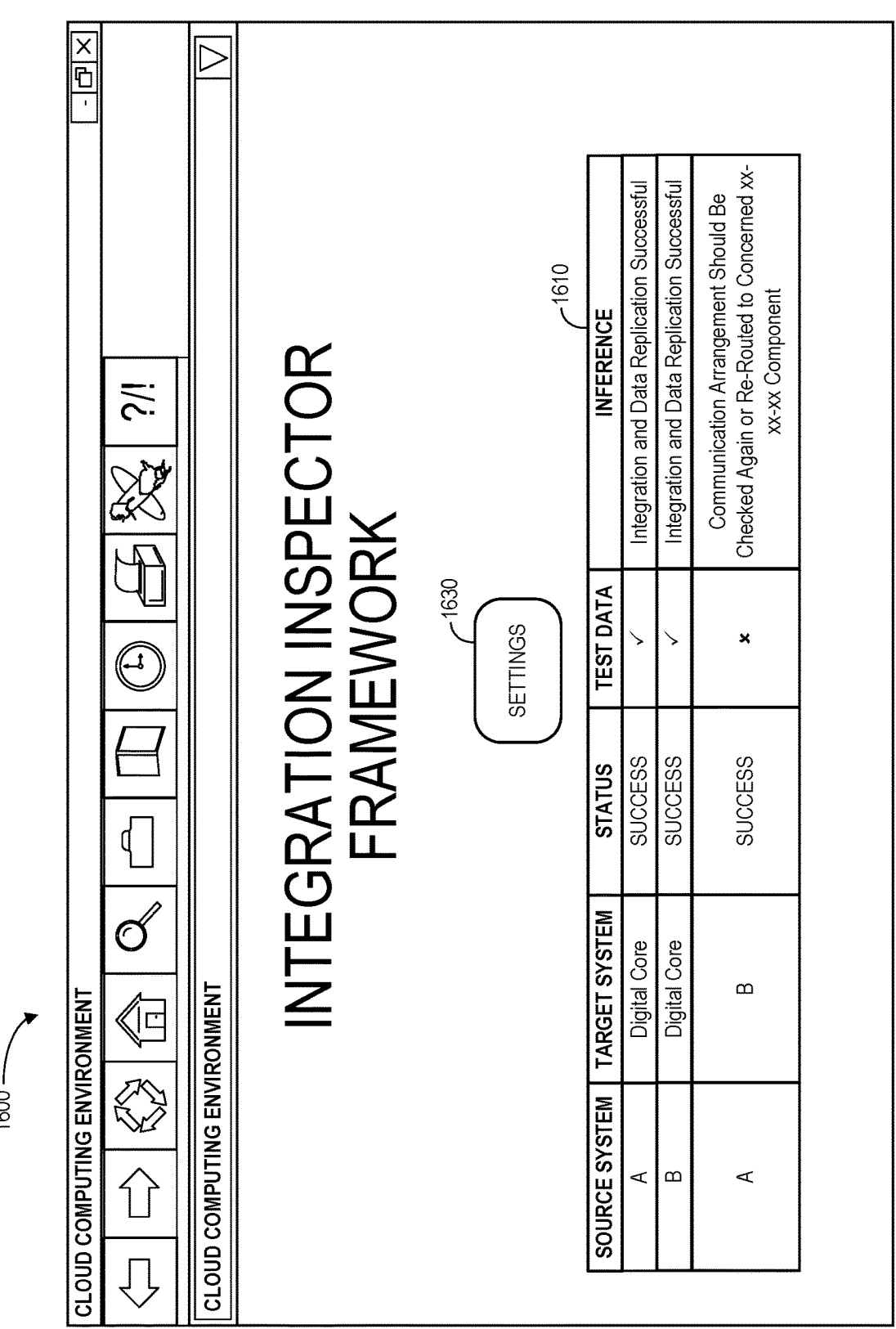
FIG. 16 is another example of an integration inspector user interface in accordance with some embodiments.

The result 1308 might then be provided to a user. For example, FIGS. 14 through 16 are examples of integration inspector user interfaces in accordance with some embodiments. In particular, FIG. 14 is an integration inspector framework display 1400 with a table 1410 indicating a source system, a target system, and an integration status. For example, as illustrated by the second entry in the table 1410 source system B and the digital core target system were successfully evaluated (e.g., information from a mock test file may have been correctly replicated from system B to the digital core). Activation of a "Select Source System" icon 1430 (e.g., via a touchscreen or computer mouse pointer 1420) may let a user add a source system, activation of a "Select Target System" icon 1440 may let a user add a target system, and activation of a "Start Integration" icon 1450 may initiate the evaluation.

FIG. 15 is an integration inspector framework display 1500 including a table 1510 that includes a source system, a target system, and an integration status. The table 1510 may also show the results of any particular integration rules or logic that was evaluated. Example, of such results may include a data replication test result, an Open Data ("OData") protocol test result, a Data Protection and Privacy ("DPP") test result, a remote function call test result, a communication arrangement test result, an Information Life-cycle Management ("ILM") test result, etc. Activation of an "Integration Checkpoints" icon 1530 may let a user see more detailed results for various checkpoints. For example, FIG. 16 is an integration inspector framework display 1600 that includes a table 1610 showing a source system, a target system, an integration status, and a data replication test result. The table 1610 also includes an inference that is automatically generated based on the integration evaluation. For example, the third entry in the table indicates that although an overall configuration evaluation from source system A to target system B indicated a success, the was nevertheless a problem when the mock data was used in a data replication test. In particular, the inference indicates that the user should double check the communication arrangement for a particular component or key field. Activation of a "Settings" icon 1630 may let the user add further information to the table 1610 (e.g., associated with OData, DPP, etc.).

Figure 17:
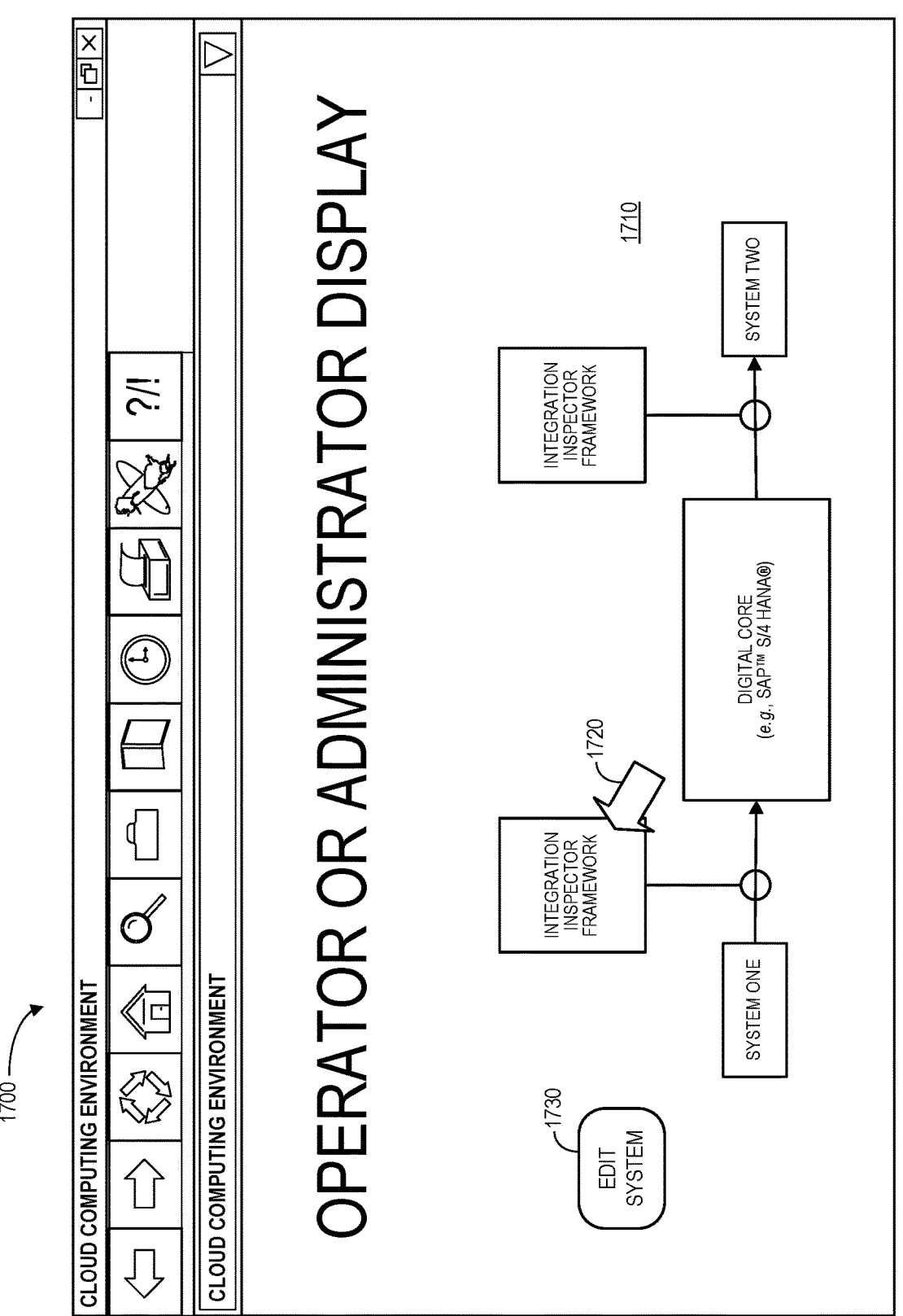
FIG. 17 is an example of an operator or administrator display according to some embodiments.

FIG. 17 is an example of an operator or administrator display according to some embodiments. The display 1700 includes a graphical representation 1710 or dashboard that might be used to manage or monitor an integration inspection framework (e.g., associated with a cloud provider). In particular, selection of an element (e.g., via a touchscreen or computer mouse pointer 1720) might result in the display of a popup window that contains communication configuration data. The display 1700 may also include a user selectable "Edit System" icon 1730 to request system changes (e.g., to investigate or improve integration, to change a field mapping parameter, etc.).

Thus, embodiments may minimize the manual effort need for communication integration and provide insights for follow-up across teams involved in the integration setup. Embodiments may minimize customer incidents resulting from integration setup issues (by discovering such issues in advance using mock data). Moreover, embodiments may provide seamless integration capabilities to enhance customer trust and improve performance for the customer base. Note that embodiments may easily accommodate new systems integration between enterprise systems, customer systems, and a digital core.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications with modifications and alterations limited only by the spirit and scope of the appended claims.

Figure 18:
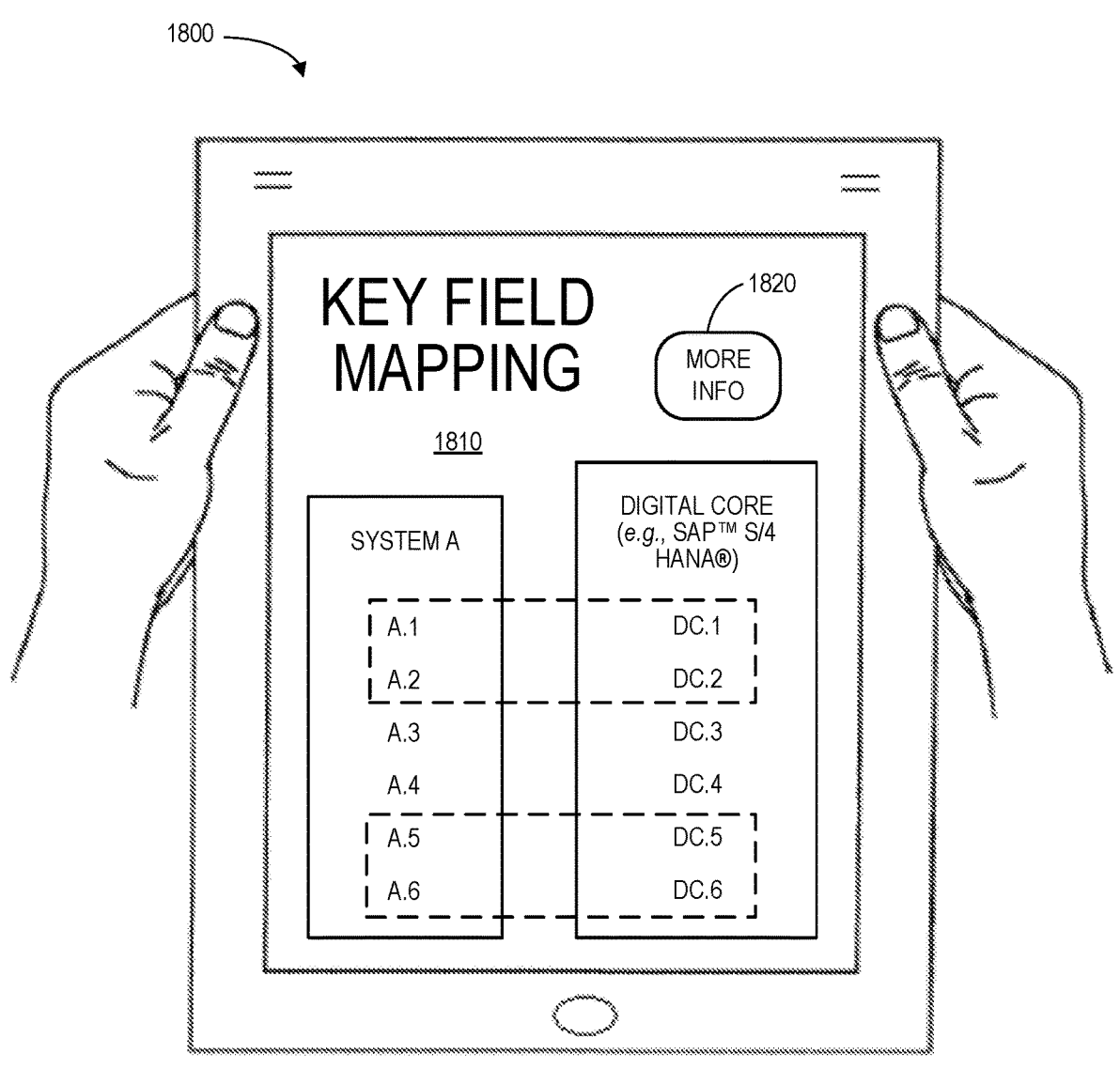
FIG. 18 is a table computer showing a field mapping display in accordance with some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of enterprise and system integrations, any of the embodiments described herein could be applied to other types of integrations. Moreover, the displays shown herein are provided only as examples, and any other type of user interface could be implemented. For example, FIG. 18 shows a handheld tablet computer 1800 rendering a key field mapping display 1810 that may be used to help a user identify and investigate potential integration problems (e.g., via a "More Info" icon 1820).

What is claimed is:

1. A system, comprising:

a digital core for a cloud computing environment associated with an enterprise;

a source application system to provide information to the digital core;

a target application system to receive information from the digital core; and an integration inspector framework, including:
 a computer processor, and
 a computer memory coupled to the computer processor and storing instructions that, when executed by the computer processor, cause the integration inspector framework to:
  establish a checkpoint between the source application system and the digital core,
  establish a checkpoint between the digital core and the target application system, wherein a user interface lets a user select the source application system and the target application system,
  automatically validate communication arrangements associated with the selected application systems,
  perform data replication tests, in connection with the selected application systems and the digital core, using test data, wherein the integration inspection framework automatically maps key fields between the source application system, the digital core, and the target application system,
  evaluate results of the data replication tests, and
  indicate an integration inspection result of said evaluations.

2. The system of claim 1, wherein the digital core is associated with enterprise resource planning software optimized for an in-memory database.

3. The system of claim 2, wherein the integration inspector framework evaluates a source application system and a target application system associated with at least one of: (i) an Internet of Things ("IoT") system, (ii) a business network, (iii) a social network, (v) particular person, (vi) a particular device, (vii) big data, (viii) a Global Trade Service ("GTS"), (ix) a human capital management system, (x) a vendor management system, (xi) a travel and expense management system, (xii) a product content management system, and (xiii) a spend management system.

4. The system of claim 1, wherein the user interface displays the integration inspection results of said evaluations.

5. The system of claim 4, wherein the integration inspection result includes all of: (i) a data replication test result, (ii) an Open Data ("OData") protocol test result, (iii) a Data Protection and Privacy ("DPP") test result, (iv) a remote function call test result, (v) a communication arrangement test result, and (vi) an Information Lifecycle Management ("ILM") test result.

6. A method, comprising:
 determining a digital core for a cloud computing environment associated with an enterprise;
 determining a source application system to provide information to the digital core;
 determining a target application system to receive information from the digital core;
 establishing, by a computer processor of an integration inspector framework, a checkpoint between the source application system and the digital core;
 establishing, by a computer processor of the integration inspector framework, a checkpoint between the digital core and the target application system, wherein a user interface lets a user select the source application system and the target application system;
 automatically validating communication arrangements associated with the selected application systems;
 performing data replication tests, in connection with the selected application systems and the digital core, using test data, wherein the integration inspection framework automatically maps key fields between the source application system, the digital core, and the target application system;
 evaluating results of the data replication tests; and
 indicating an integration inspection result of said evaluations.

7. The method of claim 6, wherein the digital core is associated with enterprise resource planning software optimized for an in-memory database.

8. The method of claim 7, wherein the integration inspector framework evaluates a source application system and a target application system associated with all of: (i) an Internet of Things ("IoT") system, (ii) a business network, (iii) a social network, (v) particular person, (vi) a particular device, (vii) big data, (viii) a Global Trade Service ("GTS"), (ix) a human capital management system, (x) a vendor management system, (xi) a travel and expense management system, (xii) a product content management system, and (xiii) a spend management system.

9. The method of claim 7, wherein the integration inspection result includes at least one of: (i) a data replication test result, (ii) an Open Data ("OData") protocol test result, (iii) a Data Protection and Privacy ("DPP") test result, (iv) a remote function call test result, (v) a communication arrangement test result, and (vi) an Information Lifecycle Management ("ILM") test result.

10. A non-transitory, machine-readable medium comprising instructions thereon that, when executed by a processor, cause the processor to execute operations to perform a method, the method comprising:
 determining a digital core for a cloud computing environment associated with an enterprise;
 determining a source application system to provide information to the digital core;
 determining a target application system to receive information from the digital core;
 establishing, by a computer processor of an integration inspector framework, a checkpoint between the source application system and the digital core;
 establishing, by a computer processor of the integration inspector framework, a checkpoint between the digital core and the target application system, wherein a user interface lets a user select the source application system and the target application system;
 automatically validating communication arrangements associated with the selected application systems;
 performing data replication tests, in connection with the selected application systems and the digital core, using test data, wherein the integration inspection framework automatically maps key fields between the source application system, the digital core, and the target application system;
 evaluating results of the data replication tests; and
 indicating an integration inspection result of said evaluations.

11. The medium of claim 10, wherein the digital core is associated with enterprise resource planning software optimized for an in-memory database.

12. The medium of claim 11, wherein the integration inspector framework evaluates a source application system and a target application system associated with at least one of: (i) an Internet of Things ("IoT") system, (ii) a business network, (iii) a social network, (v) particular person, (vi) a particular device, (vii) big data, (viii) a Global Trade Service ("GTS"), (ix) a human capital management system, (x) a vendor management system, (xi) a travel and expense management system, (xii) a product content management system, and (xiii) a spend management system.

13. The medium of claim 11, wherein the integration inspection result includes at least one of: (i) a data replication test result, (ii) an Open Data ("OData") protocol test result, (iii) a Data Protection and Privacy ("DPP") test result, (iv) a remote function call test result, (v) a communication arrangement test result, and (vi) an Information Lifecycle Management ("ILM") test result.

* * * * *